United States Patent [19]
Utamura et al.

[11] Patent Number: 5,794,431
[45] Date of Patent: Aug. 18, 1998

[54] EXHAUST RECIRCULATION TYPE COMBINED PLANT

[75] Inventors: Motoaki Utamura; Shinichi Hoizumi; Yasushi Takeda; Toshihiko Sasaki; Hideaki Komatsu; Seiichi Kirikami; Takeshi Suzumura; Tetsuo Sasada; Takashi Ikeguchi; Shigehisa Sugita, all of Ibaraki, Japan

[73] Assignee: Hitachi, Ltd., Tokyo, Japan

[21] Appl. No.: 568,176

[22] Filed: Dec. 6, 1995

Related U.S. Application Data

[63] Continuation-in-part of Ser. No. 274,425, Jul. 13, 1994, abandoned.

[30] Foreign Application Priority Data

Jul. 14, 1993 [JP] Japan .................. 5-173940

[51] Int. Cl.⁶ .................. F02C 6/18; F02C 7/00
[52] U.S. Cl. .................. 60/39.03; 60/39.182; 60/39.52
[58] Field of Search .................. 60/39.03, 39.182, 60/39.24, 39.52

[56] References Cited

U.S. PATENT DOCUMENTS

| | | | |
|---|---|---|---|
| 3,703,807 | 11/1972 | Rice | 60/39.182 |
| 3,785,145 | 1/1974 | Amann | 60/39.52 |
| 4,204,401 | 5/1980 | Earnest | 60/39.52 |

*Primary Examiner*—Louis J. Casaregola
*Attorney, Agent, or Firm*—Antonelli, Terry, Stout, & Kraus, LLP

[57] ABSTRACT

To improve the thermal efficiency when an exhaust heat recovery type combined cycle plant having a gas turbine and a steam turbine in combination is operated at a partial load, the gas turbine exhaust is recirculated and returned to the compressor, and the combustion temperature is prevented from being lowered at the partial load. Preferably, the temperature is maintained constant. In this way, the thermal efficiency during operation at partial load can be improved.

5 Claims, 15 Drawing Sheets

EXHAUST RECIRCULATION TYPE COMBINED PLANT

REFERENCE TO RELATED APPLICATIONS

The subject application is a continuation-in-part of application Ser. No. 08/274,425, filed Jul. 13, 1994, (abandoned) the content of which is incorporated herein in its entirety.

BACKGROUND OF THE INVENTION

The present invention relates to an exhaust heat recovery type thermal power plant for recovering heat of a gas turbine exhaust gas and, more particularly, to an exhaust recirculation type combined cycle plant for circulating the exhaust of a gas turbine toward the air inlet thereof.

The exhaust heat recovery type thermal power plant is composed of a gas turbine, an exhaust heat recovery boiler for recovering exhaust heat, and a steam turbine driven by steam generated by the exhaust heat recovery boiler, wherein a generator is driven by the gas turbine and the steam turbine to output electricity.

There are various types of the exhaust heat recovery type thermal power plant. As one example, Japanese Patent Laid-Open No. 45924/1989 discloses an exhaust recirculation type thermal power plant for circulating gas turbine exhaust toward the air inlet thereof.

The exhaust heat recovery type combined cycle plant can provide a rapid load variation and has a high efficiency as compared with a normal thermal electric power plant. Therefore, the exhaust heat recovery type combined cycle plant has been rapidly used in recent years, but has some problems when it is operated with a partial load.

One problem is that, at the time of partial load, the thermal efficiency greatly lowers. For example, assume that the thermal efficiency at the rated load is 1, the thermal efficiency at 50% load lowers to about 0.8, and it lowers to about 0.6 at 30% load. The combined cycle plant has the advantage that the load followability is higher than that of a thermal electric power plant using a normal boiler. The combined cycle plant is often operated with a variation in load. In this case, however, the plant is operated at the sacrifice of lowering the thermal efficiency thereof, when operated with a partial load.

A further problem is that an output variation on the side of the exhaust heat recovery boiler with a partial load is so great that it is difficult to operate the plant. For example, assuming that the output power of a steam turbine generator at the rated load is 1, it lowers to about 0.43 at 50% load, and it lowers to about 0.12 at 30% load. In addition, the response time of the gas turbine generator (the time from the increase or decrease of the amount of fuel charged into the gas turbine combustor to the change of the generation output of the gas turbine generator) is in the order of several seconds; whereas the response time of the steam turbine generator (the time from the increase or decrease of the amount of fuel charged into the gas turbine combustor to the change of the generation output of the steam turbine generator) is in the order of several minutes. It is therefore very difficult to provide control for obtaining a desired output when the load is changed and immediately thereafter.

With respect to the foregoing, the above-described prior art discloses an arrangement wherein gas turbine exhaust is circulated toward the air inlet thereof, but suggests neither the presence of the aforementioned problems, when operation is carried out at partial load, nor the specific method for solving the problems.

SUMMARY OF THE INVENTION

Accordingly, an object of the present invention is to provide an exhaust recirculation type combined plant capable of solving the above-described problems occurring at the time of partial load operation.

According to the present invention, there is provided an exhaust recirculation type combined plant for circulating exhaust from a gas turbine to a gas turbine compressor. The quantity of gas to be recirculated is increased as the load lowers. As a result, it is preferable that the quantity of exhaust to be recirculated be regulated so as to make the combustion temperature of the gas turbine combustor substantially constant.

The intake temperature is raised by the circulation of the gas turbine exhaust to the compressor and the quantity to be recirculated is increased as the load lowers, whereby the combustion temperature (i.e., the temperature of combustion gas at the inlet of the gas turbine) can be maintained substantially constant. In an exhaust heat recovery boiler, since the temperature of the gas turbine exhaust is not changed, the lowering of the evaporation amount when the load is reduced can be minimized.

According to the present invention, the thermal efficiency at partial load can be increased. Further, since the combustion temperature and the exhaust temperature from the gas turbine can be maintained constant irrespective of the load, the operability/controllability is excellent with less thermal damage to the materials constituting the devices. While the conventional record was 30% load per shaft, the operation to the gas turbine zero output operation can be made (to 10%), and the operating range is wide. Low NOx combustion can be achieved. The NOx producing rate within the combustor can be set to ¼ of the prior art. An exhaust taking-out point is set downstream of the exhaust heat recovery boiler (HRSG), whereby the output of the bottoming cycle can be maintained constant at partial load, and the operability/controllability can be further improved. An economizer can be provided in the recirculation pipe to improve the thermal efficiency of the bottoming cycle.

The present invention includes a thermal power plant, which comprises: a compressor for compressing gas; a combustor for mixing said compressed gas with fuel and for burning the mixture; a gas turbine connected to said combustor, and being arranged to be driven by the burned mixture; and a generator connected to said turbine and being arranged to be driven thereby; and means for recirculating at least some of the exhaust gas of the gas turbine to the compressor; characterized in that the thermal power plant is a combined cycle power plant and has a steam turbine driven by heat from an exhaust heat recovery boiler, the exhaust heat recovery boiler being heated by the exhaust gas of the gas turbine.

The present invention is characterized in that the recirculation means has means for controlling the amount of exhaust gas recirculated to the compressor in dependence on at least one of the load of the generator; the rate of flow of fuel to the combustor; and the load demand of an external system powered by the generator.

The present invention of a method includes operating a thermal power plant, which comprises: compressing gas in a compressor; mixing the compressed gas with fuel and burning the mixture; driving a gas turbine with the burned mixture; driving a generator using the gas turbine; and recirculating at least some of the exhaust gas of the turbine to the compressor; characterized in that the method further includes heating an exhaust heat recovery boiler with the exhaust gas of the gas turbine to generate steam, and driving a steam turbine with the steam.

The present invention is characterized in that the amount of exhaust gas recirculated to the compressor is varied in dependence on at least one of the load of the generator; the rate of flow of fuel to the combustor; and the load demand of an external system powered by the generator.

The present invention includes a controller for a thermal power plant, which comprises: means for receiving a load demand signal; means for driving an initial recirculation rate signal from the load demand signal; means for comparing the load demand signal with at least one of a load signal and a fuel flow rate signal to generate a correction signal; and means for correcting the initial recirculation rate signal in dependence on the correction signal to derive a recirculation rate control signal.

The combined plant is comprised of the two power generating equipments. They are a topping cycle comprised of the gas turbine and a bottoming cycle comprised of the boiler or the steam turbine. The former has a faster load responding characteristic and the latter has a slow responding characteristic. The slow responding characteristic results from the fact that a heat transferring passage is complex and it takes much time for energy to be transmitted from the gas turbine to the steam turbine.

Under the specified exhaust gas temperature control of the present invention, since the exhaust gas temperature is not changed even in case of a load variation, an output variation in the bottoming cycle is slow and most of the load variation can be accommodated by the topping cycle, whereby a load following-up characteristic is improved. In addition, this invention has some effects that no thermal shock or no thermal fatigue is found in the devices that form the boiler since there is no variation in exhaust gas temperature, whereby the life of the device can be extended.

Under the specified combustion gas temperature control of the present invention, a thermal efficiency of a gas turbine can be kept high even under a partial load operation. A varying range of the exhaust gas temperature during this controlling operation is not strictly kept constant.

However, a varying range of the exhaust gas temperature with a load variation is quite low as compared with that of the prior art method. It is possible to analyze that the varying range is supposed to about constant relatively.

Keeping the exhaust gas temperature and the a temperature of the combustion gas at the inlet of the gas turbine at constant values as illustrated in FIG. 7 is an approximation technique for characteristics of the present invention.

DETAILED DESCRIPTION OF THE PREFERRED EMBODIMENTS

Figure 1:
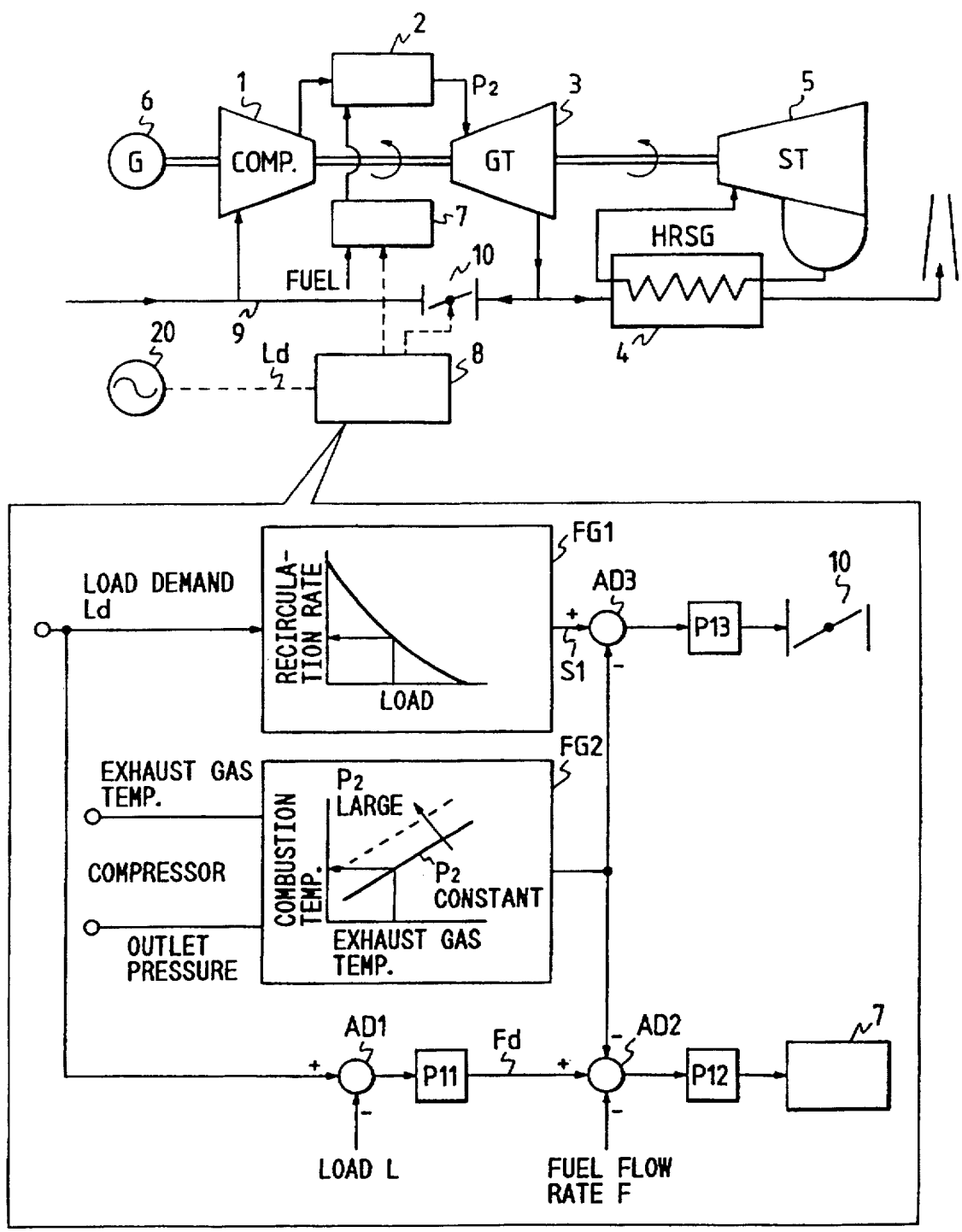
FIG. 1 is a view showing one embodiment of the present invention.

One embodiment according to the present invention is shown in FIG. 1. A combined cycle plant roughly comprises a gas turbine apparatus, an exhaust heat recovery boiler apparatus, and a steam turbine apparatus.

Among them, the gas turbine apparatus comprises a compressor 1 which sucks air to compress it, a combustor 2 which uses compressed air and fuel for combustion, and a gas turbine 3 driven by high temperature and high-pressure combustion gas from the combustor 2. In many cases, the compressor 1 and the gas turbine 3 are arranged on the same shaft, and the compressor 1 is driven by the gas turbine 3. A generator 6 is provided on the rotary shaft. The generator 6 is a synchronous machine, which is operated at constant rotational speed so that the quantity of intake air is normally maintained constant.

The exhaust gas of the gas turbine 3 is at 500° C. or more, and in the combined cycle plant, the heat is recovered by an exhaust heat recovery boiler (HRSG) 4. More specifically, the heat exchange between discharge gas and water generates steam, which is fed to a steam turbine 5 for rotation so that a generator connected to the steam turbine 5 is driven. In the illustrated embodiment, although the steam turbine 5 and the gas turbine 3 are coaxially connected, it may be so designed that the respective generators are driven by the respective turbines.

The combined cycle plant is generally constructed as described above. In the present invention, a part of the exhaust gas of the gas turbine 3 is returned, for reuse, to an air intake port of the compressor 1 through a pipe 9 and a recirculation amount control means 10. The generation output of the combined cycle plant, according to the present invention, is determined in such a manner that a fuel amount control valve 7 for controlling the fuel amount to be charged into the combustor 2 and the recirculation amount control means 10 are allowed to function as the operating ends, and the opening degree thereof is adjusted. While in the illustration, a position for recirculating a part of the exhaust gas is set at an outlet of the gas turbine 3, it is to be noted that the exhaust gas may be suitably selectively recirculated from, for example, a part of the exhaust heat recovery boiler which is further downstream thereof.

These operating ends are controlled by an operating signal from a general control apparatus 8, which in turn receives a load demand signal Ld from a power supply command center 20, which operates with respect to the combined cycle plant to control the whole plant. Other objects are operated by the general control apparatus 8, but in this specification only the operation related to the combustion control according to the present invention is described. In short, the general control apparatus 8 receives the load demand signal Ld from the power supply command center 20, and basically, properly controls the air amount and the fuel amount.

For controlling the fuel amount, a deviation between the load demand signal Ld and a real load L is first obtained by a subtractor AD1, and a fuel-amount target signal Fd is obtained by an adjuster Pl1. Then, a deviation between the fuel-amount target signal Fd and a real fuel amount F is obtained by a subtractor AD2, and the fuel amount control valve 7 is adjusted by an adjustor Pl2 to determine the fuel amount to be charged into the combustor. According to this control, the greater the load, the larger the fuel amount to be charged into the combustor 2. The control described so far is the same as an idea of conventional control.

The characteristic control according to the present invention will be described later, but this is mainly related to control of a recirculation air amount and control for correcting the fuel amount accordingly. For the control of the recirculation air amount, in accordance with the present invention, an output signal S1, which becomes higher at a lower load, is obtained in a function generator FG1, which inputs the load demand signal Ld. This signal S1 is applied to an adjustor Pl3 to control the recirculation control means 10.

It is to be understood from the foregoing description that the lower the load, the larger will be the amount of discharge gases to be returned to the air intake port of the compressor 1. In accordance with the present invention, the amount of discharge gas to be recirculated has the following technical meaning.

First, the gas turbine rotates at a constant speed. Accordingly, it may be considered that the intake air amount (volume flow rate) is constant irrespective of the load, unless a special control of the air amount is adopted. On the other hand, since the fuel amount increases in proportion to the load, the air amount becomes excessive at lower load. The combustion temperature or the temperature of the gas turbine exhaust gas inevitably tends to lower.

In the case of the present invention, outside air of an atmospheric temperature and the gas turbine exhaust gas of a high temperature are mixed to form intake air, and the amount of the gas turbine exhaust gas to be recirculated increases at lower loads. It is therefore possible to prevent the combustion temperature or the temperature of the gas turbine exhaust gas from being lowered as the load reduces. More preferably, it is possible to make the combustion temperature (temperature of the gas turbine exhaust gas) substantially constant irrespective of the load. In view of the foregoing explanation, the function generator FG1 shown in FIG. 1 determines the recirculation rate of the exhaust gas. Accordingly, the output signal S1 of the function generator FG1 represents, in the illustrated embodiment, a signal adapted to make the temperature of the gas turbine discharge gas substantially constant irrespective of the load.

In the present invention, the combustion temperature can be made constant according to the output of the function generator 1. In a real operation, the combustion temperature sometimes changes. Therefore, the combustion temperature is presumed in the function generator 2 on the basis of the temperature of the gas turbine exhaust gas and the outlet pressure of the compressor, and the output of the function generator 1 is applied to a subtractor AD3 to correct the output of the function generator 1. When such correction and control are carried out, the fuel amount is also corrected and controlled in order to balance the fuel amount and the air amount.

Next, a description will be made of the fact that the desired object is attained by the process constructed and operated as shown in FIG. 1.

Figure 2:
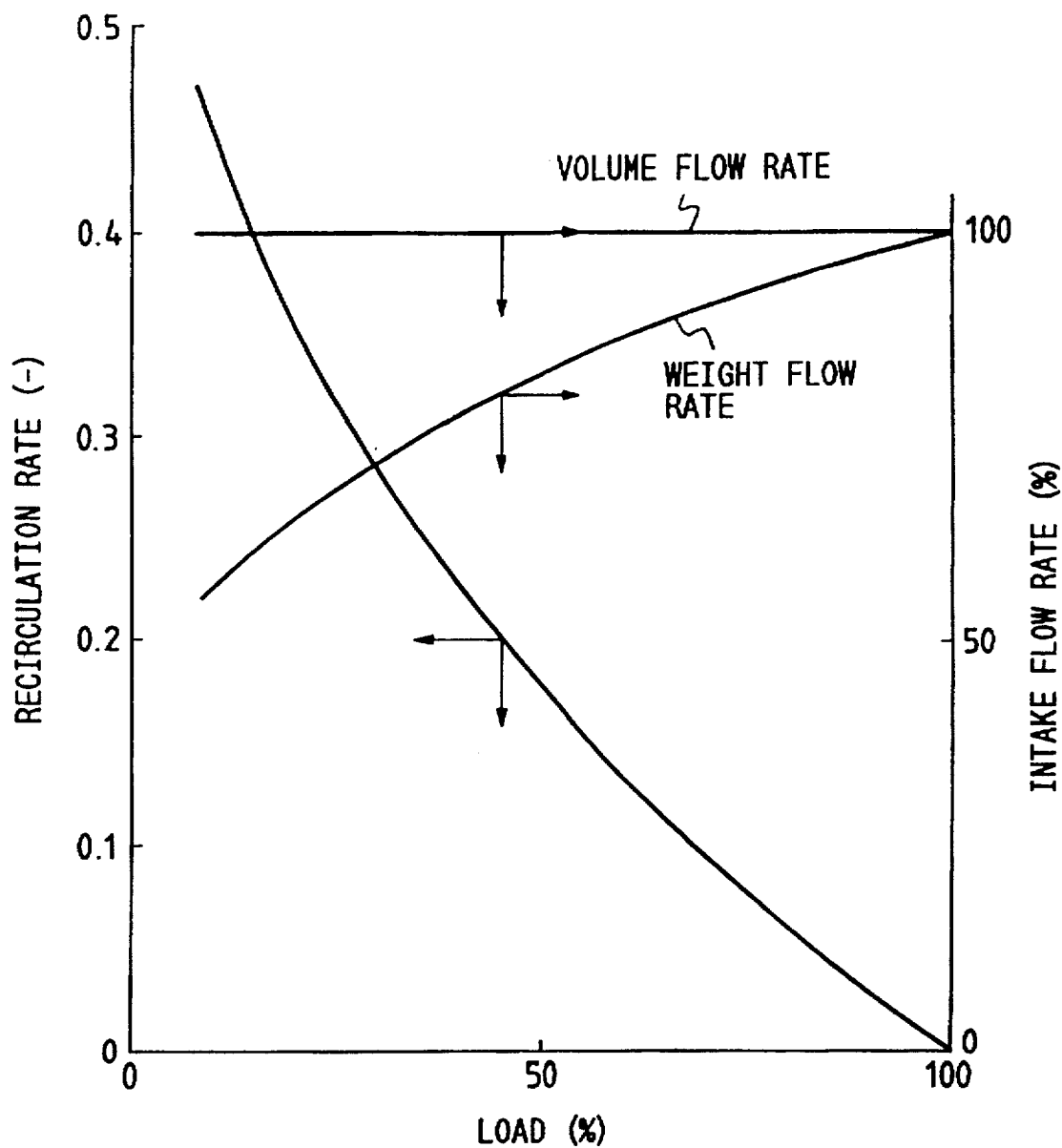
FIG. 2 is a view showing the load dependency for combustion temperature and air flow rate.

First, FIG. 2 shows the relationship among the volume flow rate and weight flow rate of a mixture taken into the compressor 1, the rate of recirculation, and the load. The volume flow rate is constant irrespective of the load, but the weight flow rate reduces as high temperature air increases. The recirculation amount in the case where the high temperature air is recirculated from the gas turbine outlet is about 20% at 50% load, and about 30% at 30% load.

Incidentally, the pressure ratio between the inlet and the outlet of the compressor is primarily determined according to the shape of the blades of the compressor 1 and the axial flow velocity of the intake. In the case of the present invention, the temperature of a mixture taken into the compressor 1 changes with the load (the higher the load, the higher will be the temperature). However, the volume flow rate flowing into the compressor does not change, and accordingly, the axial flow velocity also does not change. Therefore, the pressure ratio during operation at a partial load does not change. This process is close to an adiabatic change, and the temperature rises as the pressure rises. The ratio of an increase in outlet temperature with respect to an increase in mixture temperature above the temperature of outside air is about 2, for example, when the pressure ratio is 15.

Compressed air is heated up to a combustion temperature under equal pressure by the combustor 2. According to the present invention, the lowering of the combustion temperature, when the load lowers, is suppressed. According to the embodiment shown in FIG. 1, the combustion temperature is maintained constant even at partial load. Next, the combustion gas work during the adiabatic expansion by the gas turbine 3, and a part thereof, is consumed to drive the compressor 1 and the generator 6, and the net output corresponds to a difference therebetween.

A part of the exhaust of the gas turbine 3 is recirculated as a part of the intake of the compressor 1 via the pipe 9 and the control means 10. The residual exhaust is scattered into outside air after the enthalpy has been recovered by the exhaust heat recovery boiler 4. In the exhaust heat recovery boiler 4, high pressure vapor is generated to drive the steam turbine 5 and the generator 6 to generate electricity.

Figure 3:
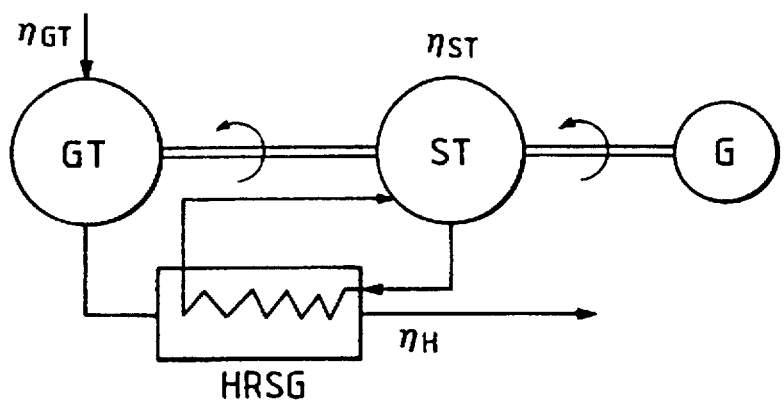
FIG. 3 is a view showing the cycle structure of a conventional combined plant.

Next, a description will be made of the fact that a desired effect can be attained by the present invention. First, FIG. 3 schematically shows the efficiency in the combined cycle plant which does not perform the exhaust recirculation. Letting $\eta_{GT}$ be the efficiency of the gas turbine; $\eta_{ST}$, the efficiency of the steam turbine; and $\eta_B$, the efficiency of the exhaust heat recovery boiler, the overall efficiency $\eta$ can be expressed by the following equation 1.

$$\eta = \eta_{GT} + (1-\eta_{GT})\eta_{ST}\eta_B \quad (1)$$

Figure 4:
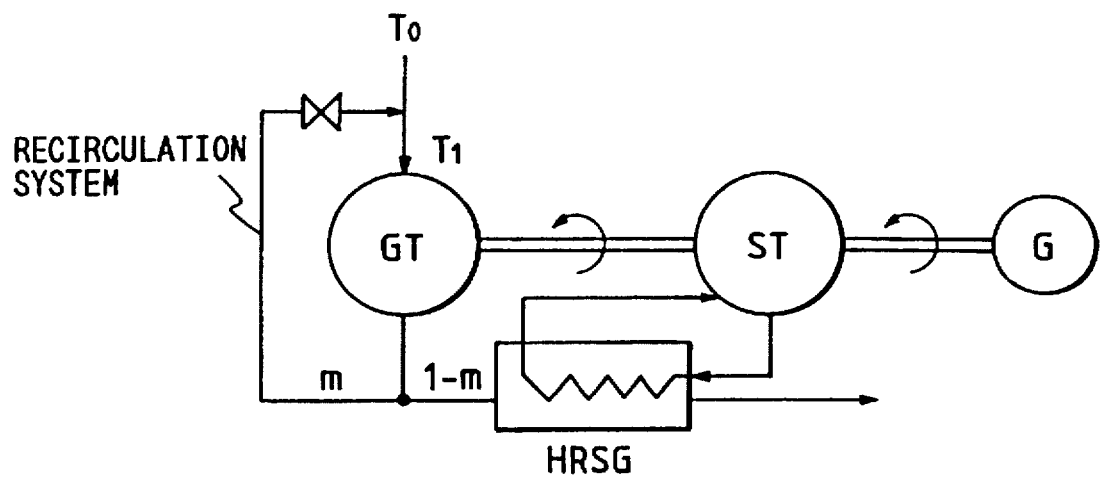
FIG. 4 is a view showing the cycle structure having a recirculating system according to the present invention.

FIG. 4 schematically shows the efficiency in the combined cycle plant according to the present invention, wherein T designates the temperature of each part; and m, the rate of the amount of recirculation gas.

$$\eta = \eta_{GT} + l(1 - \eta_{GT}) + \frac{1-\nu}{\tau - \{1 + (\phi^{n} - 1)/\eta_c\}} \cdot lX \qquad (2)$$

$$\eta_B\{_{st} + m(1 - \eta_{st})\}$$

where, m: Exhaust recirculation rate (weight reference) (−)
To: Atmospheric temperature (K)
T1: Intake temperature at inlet of compressor (K)
T3: Combustion temperature (K)
τ: Temperature ratio (≡T3/T1)
φ: Pressure ratio (−)
n: (x−1)/x (x: specific heat ratio) (−)
ν: Temperature ratio (≡To/T1) (−)
$\eta_c$: Compressor efficiency (−)

Figure 5:
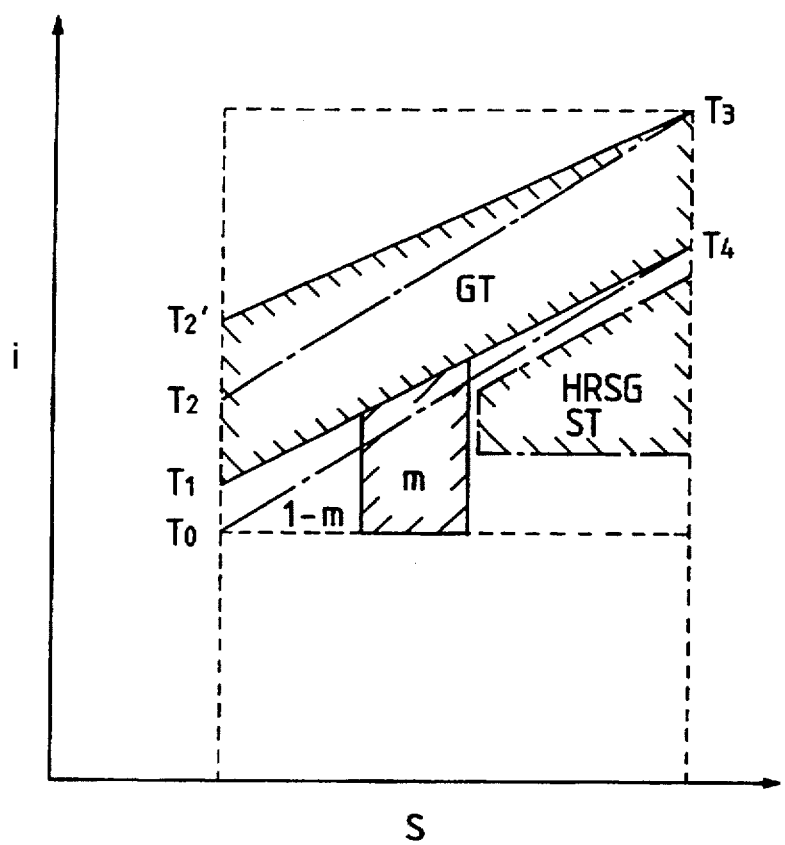
FIG. 5 is a T-S diagram of a thermal cycle.

FIG. 5 is a diagram of the heat cycle expressed by enthalpy i and entropy S. The portion surrounded by the dotted line shows characteristics of the Carnot cycle; the sum of the gas turbine portion GT and the exhaust heat recovery boiler (steam turbine) portions HRSG, ST surrounded by the chain line, characteristics of the conventional system without effecting the recirculation; and the portion surrounded by the solid line, characteristics according to the present invention.

As will be apparent from the characteristic view, in the present invention, the portion m by way of the recirculation is added as compared with the conventional system without carrying out the recirculation. As described above, according to the present invention, the combustion process of the gas turbine is made approximate to the isothermal change which is characteristic to the Carnot cycle and the enthalpy of the gas turbine exhaust is partly recovered to thereby improve the thermal efficiency. In FIG. 5, T2 designates the inlet temperature of the combustor; T3,the outlet temperature of the combustor; and T4, the outlet temperature of the gas turbine.

Figure 6:
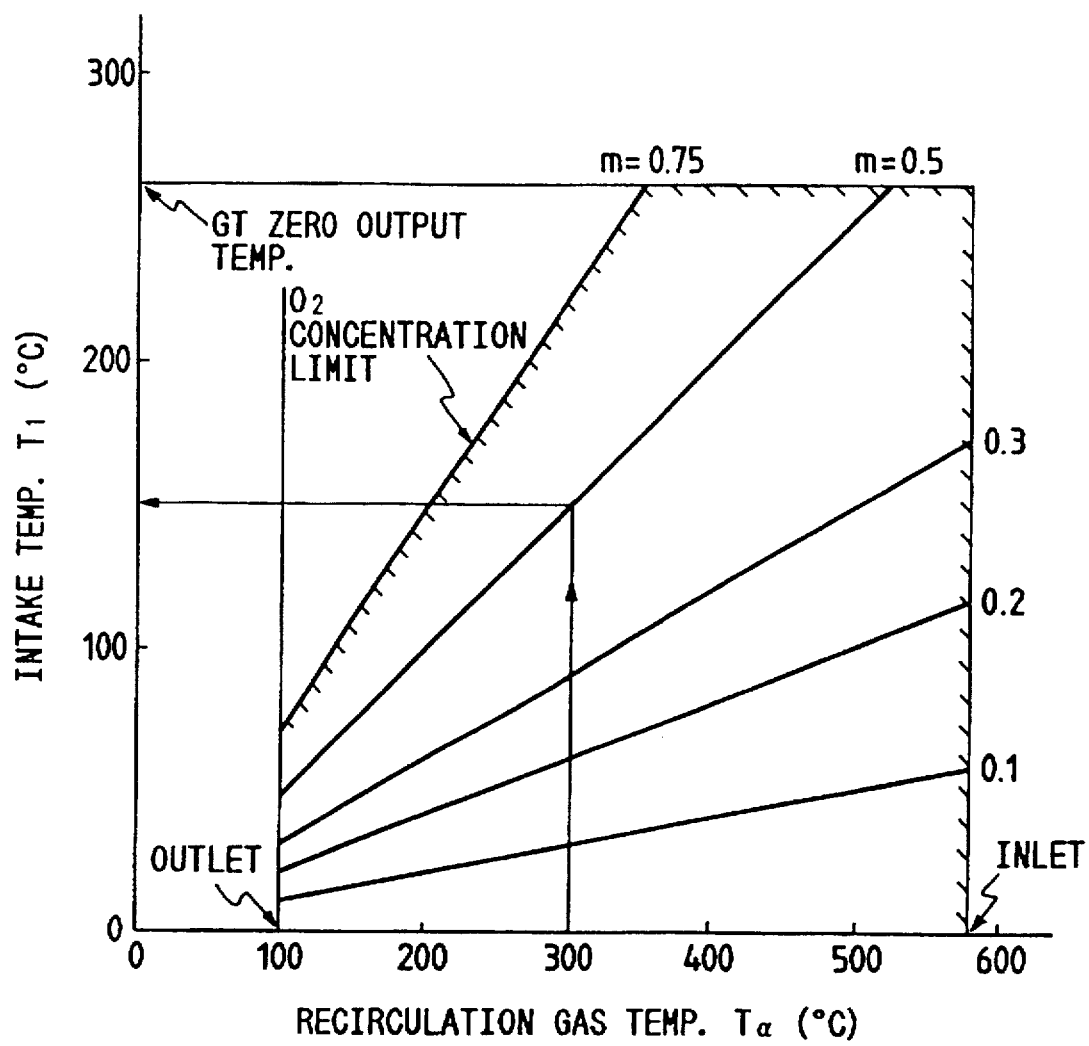
FIG. 6 is a view showing the selectable range of an extract temperature and extract amount of exhaust.

The position at which the gas turbine exhaust is recirculated according to the present invention can be set arbitrarily as previously mentioned. FIG. 6 shows the relationship among the temperature Tα of exhaust to be recirculated, the rate m of exhaust, and the inlet intake temperature $T_1$ of the compressor. In this characteristics, when the atmospheric temperature $T_o$=0° C., the outlet temperature of the combustor $T_3$=1200° C., and the oxygen consumption rate is 5%, the inlet intake temperature $T_1$ of the compressor is calculated. The selective range of the temperature Tα of the recirculation gas and the rate of exhaust extraction m is determined according to the condition for setting the oxygen concentration in the gas turbine exhaust at zero and the conditions of the zero output temperature and exhaust temperature of the gas turbine.

Figure 7:
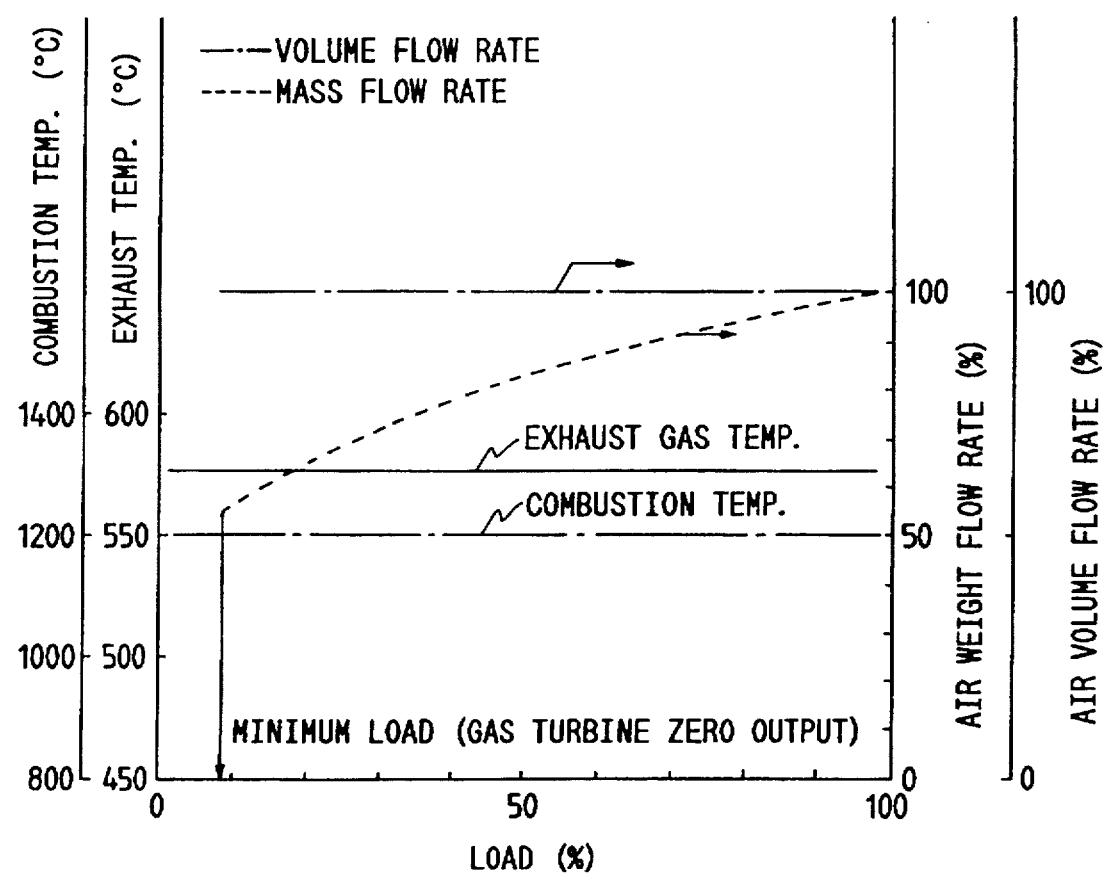
FIG. 7 is a view showing the relationship between an air weight flow rate and a load.
Figure 8:
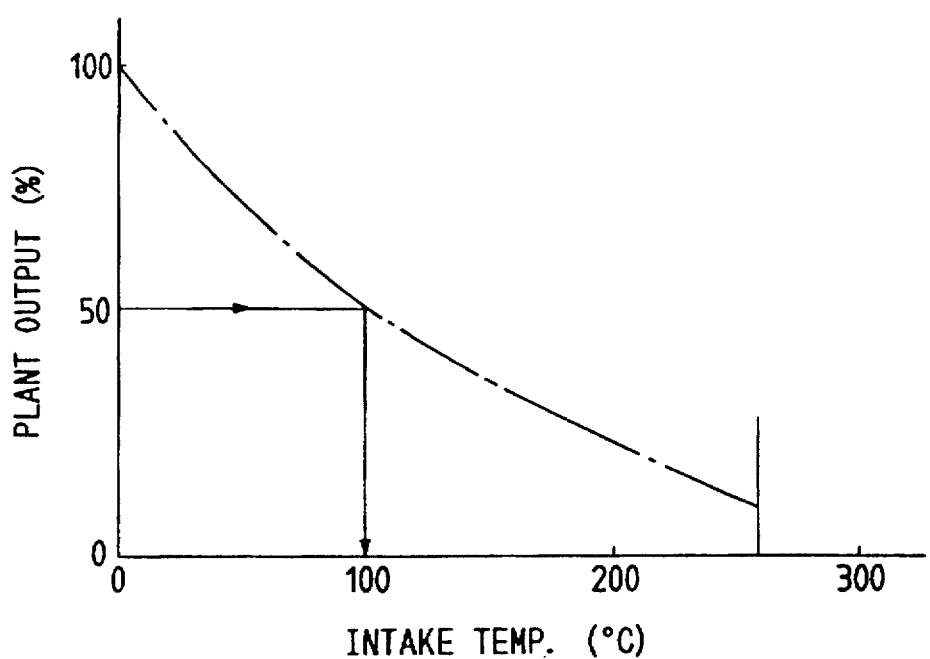
FIG. 8 is a view showing the relationship between a temperature of a mixture and a plant output.

FIG. 7 shows variations of the volume capacity (chain line) of intake air when a load changes, the weight flow rate (dotted line), the combustion temperature, and the gas turbine exhaust temperature. Since the combustion temperature and the gas turbine exhaust temperature are assumed to be constant irrespective of the output, control parameters are reduced by two to render the operation easy. As the recirculation flow rate changes so as to maintain the inlet volume flow rate of the compressor constant, the air weight flow rate of the gas turbine changes with respect to the load as shown. The weight flow rate at the minimum load is about ½ of the rated load.

From the foregoing description, one example of tables of an output (load demand) for making a gas turbine exhaust temperature constant and an intake temperature is shown. This characteristic is the characteristic when the atmospheric temperature is 0° C. Accordingly, when the recirculation rate m is O with 100% load, the intake temperature is 0° C. In case of 50% load, the intake temperature may be set to 100° C. From this, the recirculation rate of the gas turbine exhaust gas is determined. Similar characteristics may be likewise set even in case of an arbitrary atmospheric temperature. The characteristic of the function generator FG1 shown in FIG. 1 determines the relationship between the load demand Ld and the recirculation rate m with the atmospheric temperature being a parameter.

Figure 9:
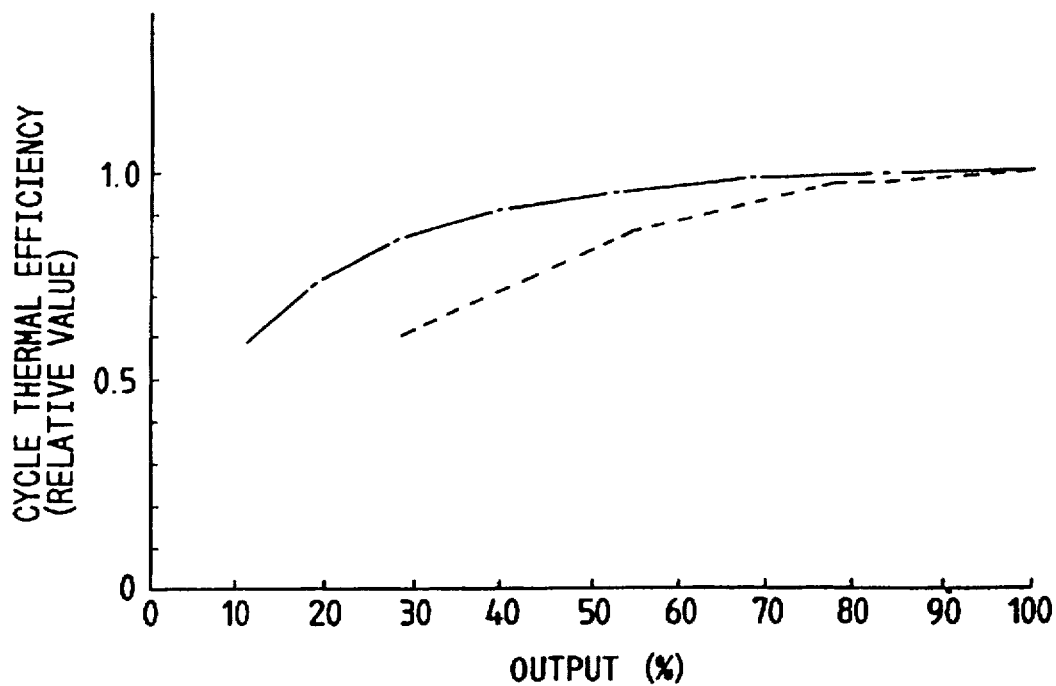
FIG. 9 is a view showing excellent efficiency of a partial load according to the present invention.

FIG. 9 shows the comparison between the lowering of efficiency during operation at a partial load with the efficiency of the thermal cycle (dotted line) without recirculation of the gas turbine exhaust gas. In the present invention (chain line), the recirculation flow rate of exhaust at a partial load increases, and the enthalpy recovery rate of exhaust becomes large. Therefore, lowering of the efficiency at a partial load is small. Furthermore, since the axial flow velocity of air within the compressor 1 remains unchanged, no critical current occurs at surge or an inlet. Theoretically, the gas turbine 3 can be operated to the zero output. Therefore, there is a feature that the plant can be operated stably to a load lower than that of the conventional system.

Figure 10:
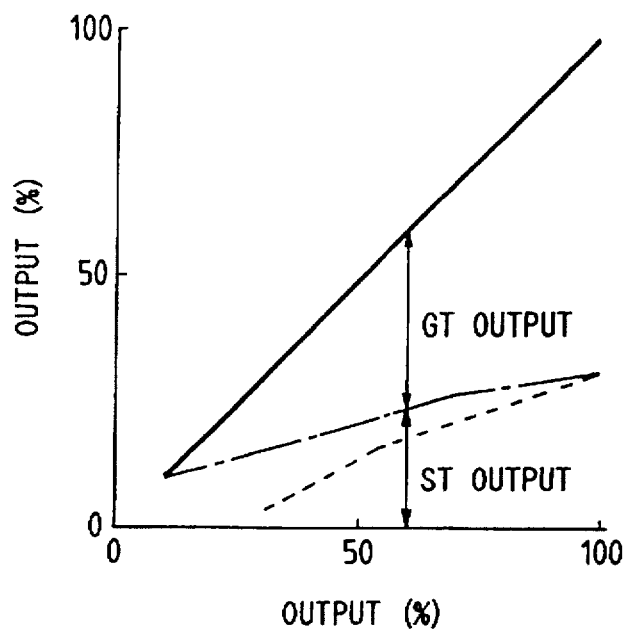
FIG. 10 is a view showing output distributions of topping and bottoming cycles.

FIG. 10 shows the output distribution of a topping cycle (the gas turbine system) and a bottoming cycle (the exhaust heat recovery boiler and steam turbine system). In the conventional system indicated by the dotted line, the temperature of the gas turbine exhaust gas greatly lowers as a load lowers. Therefore, the evaporation amount of steam generated in the exhaust heat recovery boiler greatly varies, as a consequence of which there gives rise to a problem in that the output of the steam turbine rapidly lowers at a partial load. Further, since the bottoming cycle is composed of complicated steam circuit, the setting time with respect to the disturbance is in the order of from 5 to 10 minutes. It was necessary for obtaining a plant having a good followability with respect to the load demand to decrease the output variation of the bottoming cycle.

In the present invention, since the enthalpy of the gas turbine exhaust gas is recovered, the output of the bottoming cycle is slow with respect to the lowering of the plant output. There are effects in that the operation of the bottoming cycle whose time constant with respect to the topping cycle is large becomes easy, and that the load followability of the plant is good. The effect that the lowering of the bottoming cycle output is less results from the fact that the exhaust temperature of the gas turbine is constant irrespective of the variation of loads. The slight lowering of efficiency at a partial load results from the reduction in exhaust flow rate. Further, the conventional system has a problem in that the exhaust temperature varies at a partial load, and as a result, when the operation with a partial load is often carried out, the materials for the gas turbine and HRSG are subject to damage due to thermal fatigue and creep deformation. In the present invention in which the exhaust temperature is constant, this problem can be prevented.

Figure 11:
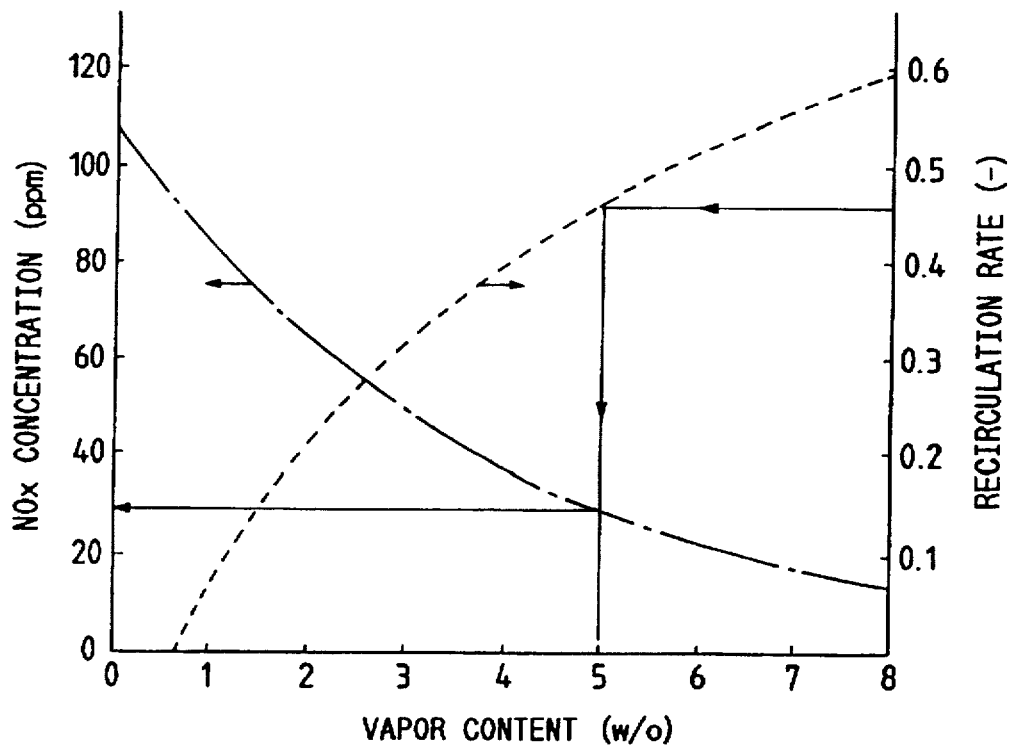
FIG. 11 is a view showing that NOx can be considerably reduced according to the present invention.
Figure 12A:
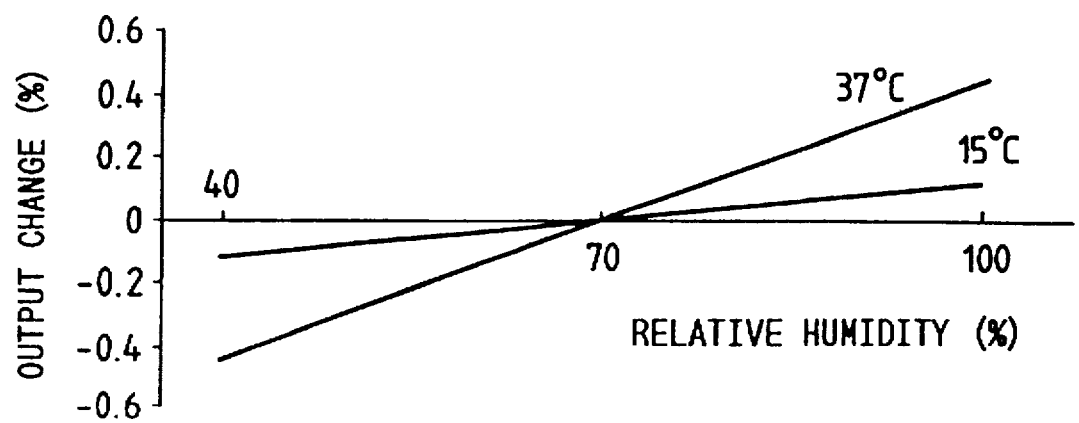
FIGS. 12a and 12b are views showing the relationship among relative humidity, output and efficiency.
Figure 12B:
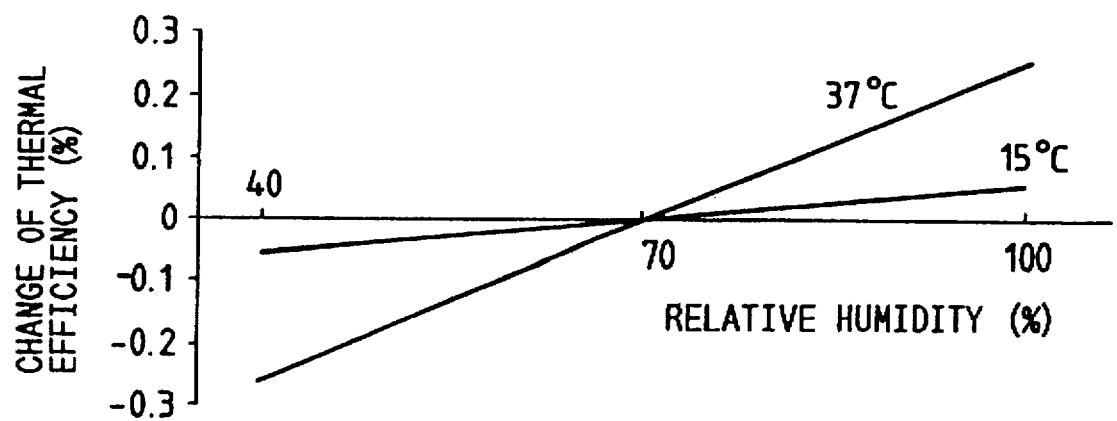

FIG. 11 is a view for assisting an explanation the manner in which NOx is reduced. In the case where the combustion is carried out by the combustor 2 using LNG as fuel, water vapor of 5% in weight is produced. This water vapor is refluxed by recirculation and again introduced into the combustor. In this case, formation of NOx can be suppressed by water vapor. There is such a characteristic that the concentration of water vapor in intake is high at a partial load with much recirculation amount so that the effect of reducing NOx is high. FIG. 12(a) shows a change in output with respect to the relative humidity with the atmospheric temperature being a parameter, and FIG. 12(b) sows a change in thermal efficiency. As shown in FIGS. 12(a) and 12(b), when the humidity rises, the cycle efficiency is improved and the output increases.

Figure 13:
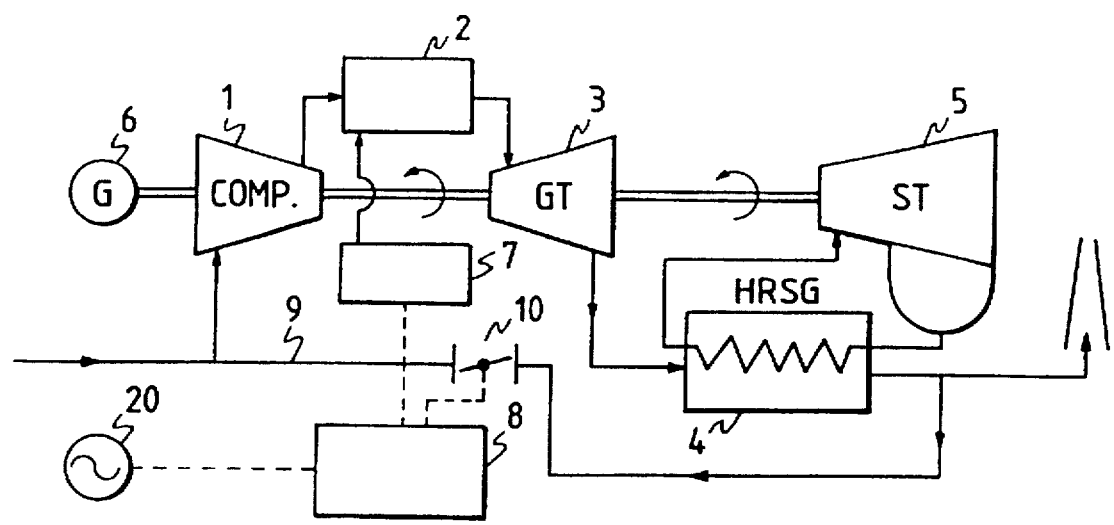
FIG. 13 is a view showing another embodiment of the present invention.

FIG. 13 shows a second embodiment. In the first embodiment, the port for the pipe 9 is the outlet of the gas turbine 3, whereas in the present embodiment, a taking-out port is provided at an outlet of the HRSG 4. In this case, there is an effect in that even at a partial load, the exhaust flow rate of the HRSG 4 and the output of the bottoming cycle are held in values at the rated output. That is, since the change of the cycle thermal output is equal to the output change of the gas turbine 3, the control of operation at a partial load becomes easy. In this case, the cycle thermal efficiency can be expressed by Equation 3. Since the exhaust temperature of the taking-out port is low (see FIG. 5), the load range, to which the present embodiment is applicable, is limited.

$$\eta = \eta_{GT} + l(1 - \eta_{GT}) + \frac{1-\nu}{\tau - \{1 + (\phi n - 1)/\eta_c\}} \eta_B \eta_{ST} \quad (3)$$

Figure 14:
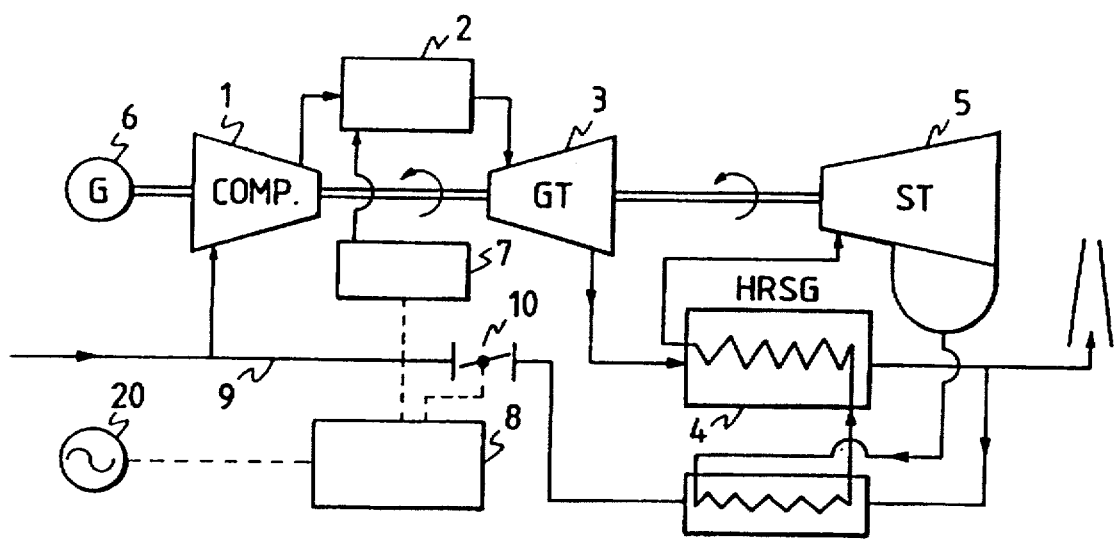
FIG. 14 is a view showing a further embodiment of the present invention.

FIG. 14 shows a third embodiment. In the present embodiment, a heat transfer area of the HRSG 4 is increased in advance, and the enthalpy of recirculation exhaust is recovered by the HRGS 4, after which it is introduced into a compressor 1. In the prior art, the exhaust temperature at the outlet of the HRSG 4 cannot be lowered because of measures against white smoke. However, waste heat can be effectively recovered by employment of the above arrangement. In this case, the thermal cycle efficiency can be expressed by Equation 4 below.

$$\eta = \eta_{GT} + (1-\eta_{GT})\{\eta_B + m(1-\eta_B)\}\eta_{ST} \quad (4)$$

The first to third embodiments have a common effect that can prevent a seasonal variation of the plant output. In the gas turbine 3, the output varies with the change in atmospheric temperature, but in case of the present invention, since an intake temperature can be fixed, the above-described phenomenon can be avoided.

Figure 15:
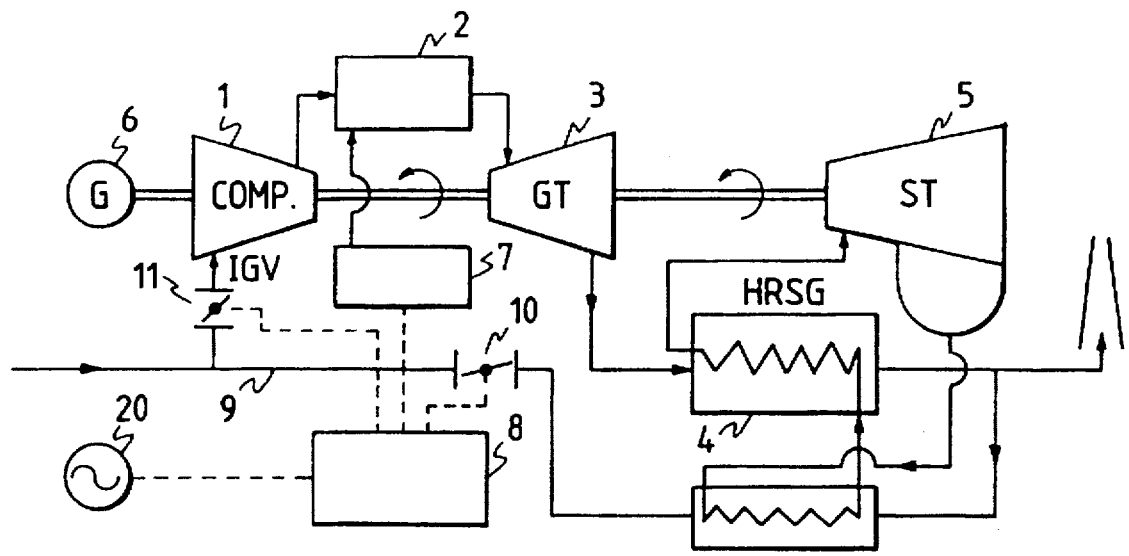
FIG. 15 is a view showing still another embodiment of the present invention.

FIG. 15 shows a fourth embodiment of a combination representing the method shown in the third embodiment and the prior art. The adjustment of the load is associated with an increase or decrease in air amount by using an inlet guide vane (IGV) 11 provided at a compressor inlet, but the intake temperature is maintained constant irrespective of the seasons and loads. All of the above-described embodiments can be used for all kinds of combined plants using the gas turbine 3.

Figure 16:
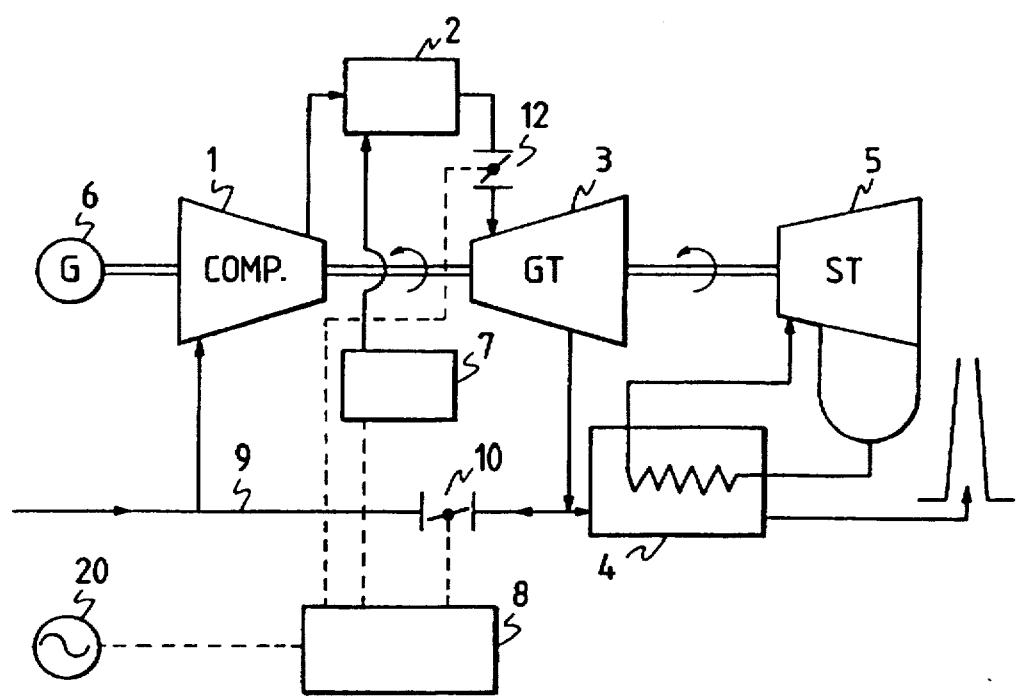
FIG. 16 is a view showing another embodiment of the present invention.

FIG. 16 shows a fifth embodiment wherein a variable vane 12 which throttles a passage is provided in the gas turbine. In the previous embodiments, there is the possibility that, when the mass flow rate of the compressor 1 is lowered, while maintaining the pressure ratio, a surge or stall phenomenon occurs. To avoid this, the opening degree of the variable vane is adjusted by the control system 8 to control the air pressure at the outlet of the compressor 1.

Figure 17:
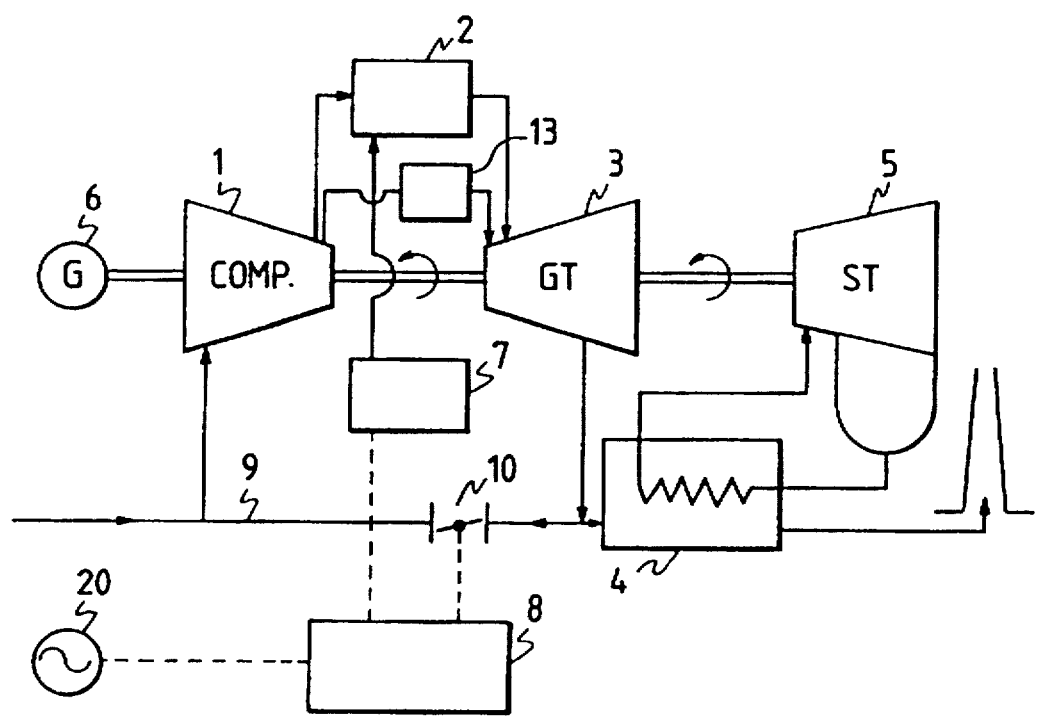
FIG. 17 is a view showing another embodiment of the present invention.

FIG. 17 shows a sixth embodiment provided with an intercooler 13. There is the possibility that at a low partial load, the temperature at the outlet of the compressor 1 becomes so high that cooling of the vanes of the gas turbine by air extracted from the compressor 1 cannot be effectively carried out. To avoid this, air extracted from the compressor 1 is cooled by the intercooler. Further, if the combustion temperature is controlled by the control system 8, the vanes of the gas turbine can be more effectively cooled. The above-described fifth and sixth embodiments have the effect of enlarging the partial load zone.

Figure 18:
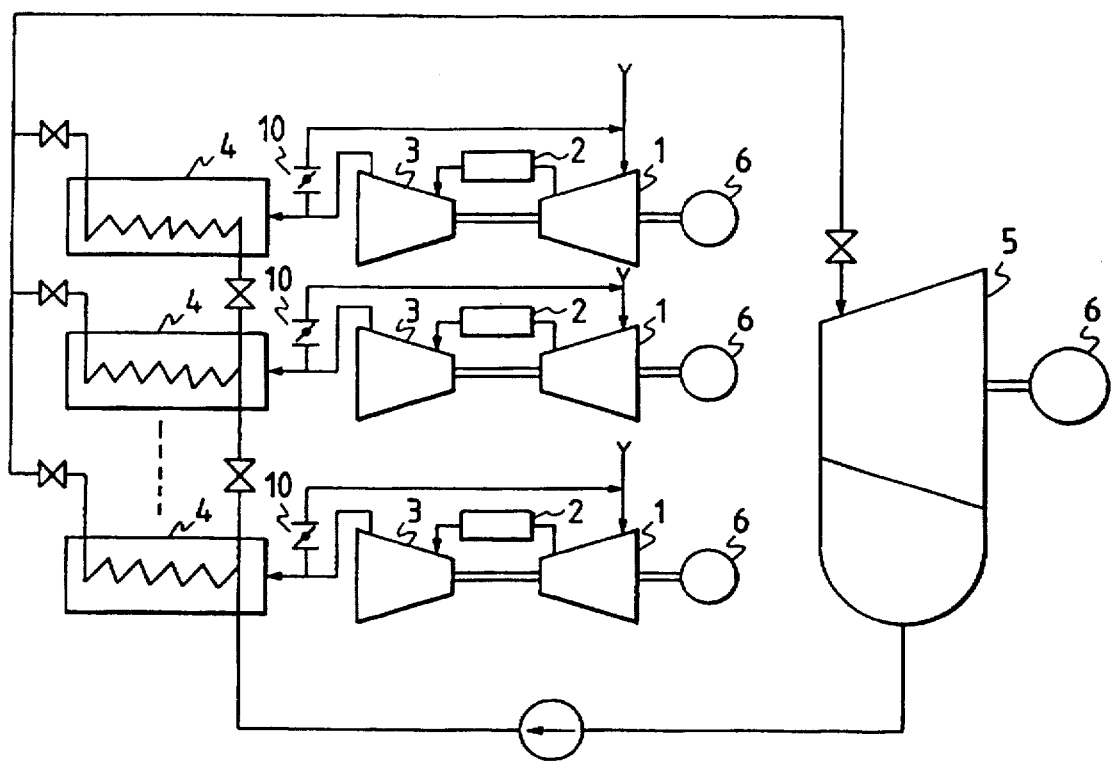
FIG. 18 is a view showing another embodiment of the present invention.

While FIG. 1 shows the construction of a single shaft type arrangement, the present invention is preferable for a multi-shaft type arrangement. The reason is that since the exhaust temperature of the gas turbine does not change when the load is varied, the variation of the vapor condition between the shafts is small. FIG. 18 shows an embodiment applied to a multi-shaft type combined plant. In the present invention, even if the respective gas turbines are in different load states, there is little difference in the temperature of the exhaust gas from the gas turbine, and therefore, the load of the steam turbine can be easily controlled.

Figure 19:
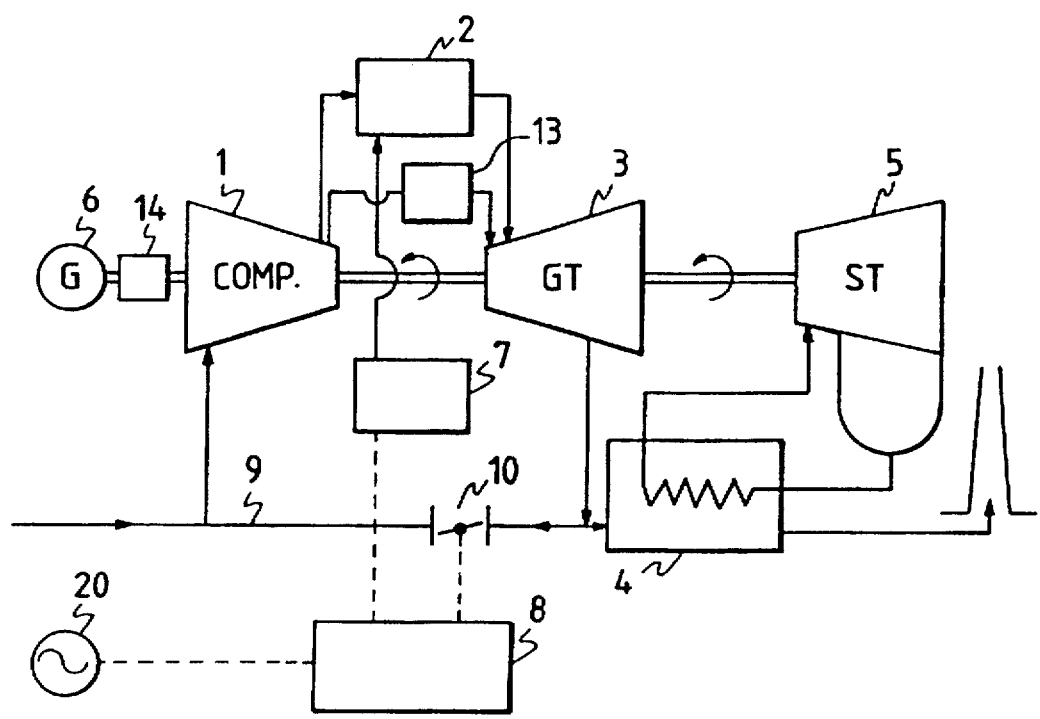
FIG. 19 is a view showing another embodiment of the present invention.

FIG. 19 shows a seventh embodiment. A compressor 1, a gas turbine 3 and a steam turbine 5 are provided on the same shaft, and a speed regulating mechanism 14 is disposed at a portion in connection with the shaft of a generator 6. The speed regulating mechanism may comprise any member, such as a gear, a fluid coupling, a thyristor, or a GTO, as long as the generator can maintain a constant rotational frequency with respect to a change in rotational frequency of a turbine system. In the present embodiment, the rotational frequency of the turbine and the volume flow rate of the compressor are controlled proportionally to the square root of the temperature of a mixed gas at the inlet of the compressor. Thereby, there is an advantage that the corrected flow rate and corrected rotational frequency of the compressor can be maintained constant even at partial load.

Figure 20:
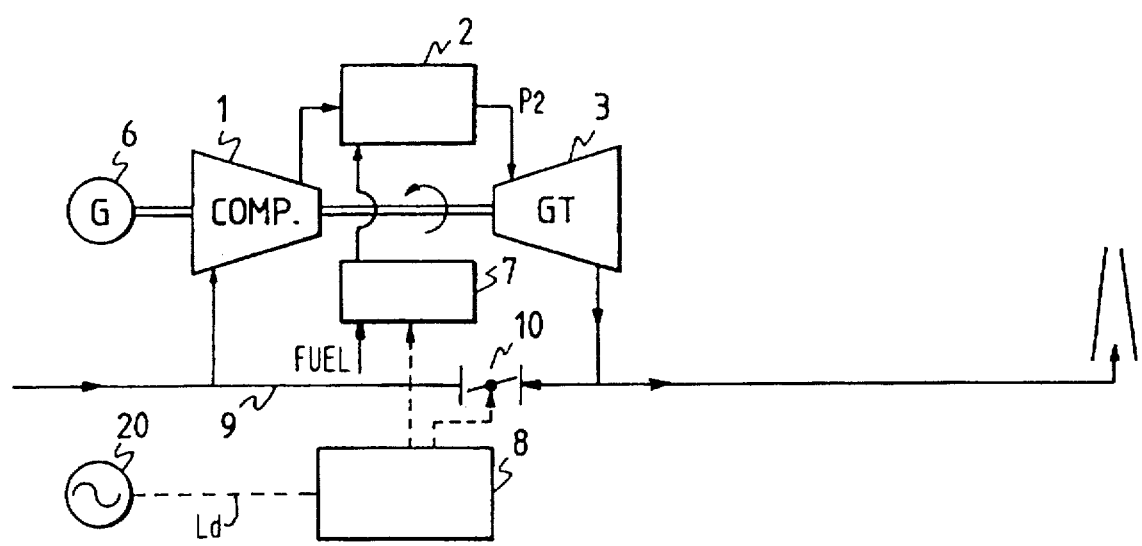
FIG. 20 is a view showing another embodiment of the present invention.

FIG. 20 shows an embodiment being applied to a gas turbine plant. The present invention can apply to a gas turbine plant which has no exhaust heat recovery boiler and steam turbine. The gas turbine apparatus comprises a compressor 1 which sucks air to compress it, a combustor 2 which uses compressed air and fuel for combustion, and a gas turbine 3 driven by a high temperature and high-pressure combustion gas from a combustor 2. In may cases, the compressor 1 and the gas turbine 3 are arranged on the same shaft, and the compressor 1 is driven by the gas turbine 3. A generator 6 is provided on the rotary shaft. In the present invention, a part of the exhaust gas of the gas turbine 3 is returned, for reuse, to an air intake port of the compressor 1 through a pipe 9 and a recirculation amount control means 10. In this embodiment, the gas turbine plant can recover effectually a heat of gas turbine exhaust gas, as well as the embodiment shown in FIG. 1.

We claim:

1. A thermal power plant, comprising:

a compressor for compressing gas;

a combustor for mixing said compressed gas with fuel and for burning the mixture;

a gas turbine connected to said combustor, and being arranged to be driven by the burned mixture;

a generator connected to said gas turbine and being arranged to be driven thereby; and recirculation means for recirculating at least some of the exhaust gas of the gas turbine to the compressor;

characterized in that:

the recirculation means has control means for controlling the amount of exhaust gas recirculated to the compressor at a partial load condition of the thermal Dower plant in dependence on at least one of:

(a) the load of the generator;

(b) the rate of the flow of fuel to the combustor; and (c) the load demand of an external system powered by the generator;

in order to maintain a temperature of the gas turbine exhaust gas or a temperature of the burned mixture at the inlet of the gas turbine at a constant level.

2. A method of operating a thermal power plant, comprising the steps of:

compressing gas in a compressor;

mixing the compressed gas with fuel and burning the mixture;

driving a gas turbine with the burned mixture;

driving a generator using the gas turbine;

recirculating at least some of the exhaust gas of the gas turbine to the compressor; and varying the amount of exhaust gas recirculated to the compressor at a partial load condition of the thermal power plant in dependence on at least one of:

(a) the load of the generator;

(b) the rate of the flow of fuel to the combustor; and (c) the load demand of an external system powered by the generator;

in order to maintain a temperature of the gas turbine exhaust gas or a temperature of the burned mixture at the inlet of the gas turbine at a constant level.

3. An exhaust recirculation type gas turbine plant in which air compressed by a compressor is fed to a combustor to burn fuel so as to drive a gas turbine, and a part of the gas turbine exhaust gas is returned to a compressor inlet, comprising means for increasing the quantity of the gas turbine exhaust gas to be returned to the compressor inlet as a load of the gas turbine plant lowers to maintain a temperature of the gas turbine exhaust gas or a temperature of combustion gas at an inlet of the gas turbine at a constant level.

4. A thermal power plant according to claim 1, further comprising an exhaust heat recovery boiler for generating steam using the exhaust gas of the gas turbine, and a steam turbine driven by the steam generated by the exhaust heat recovery boiler, wherein a generator is connected to the steam turbine to be driven thereby.

5. A thermal power plant according to claim 1, wherein the control means comprises means for receiving a load demand signal;

means for driving an initial recirculation rate signal from the load demand signal;

means for comparing the load demand signal with at least one of a load signal and a fuel flow rate signal to generate a correction signal; and means for correcting the initial recirculation rate signal in dependence on the correction signal to derive a recirculation rate control signal.

* * * * *